United States Patent
Kobayashi et al.

(10) Patent No.: US 6,878,313 B2
(45) Date of Patent: Apr. 12, 2005

(54) METHOD OF FABRICATING SINTERED NUCLEAR FUEL COMPACT

(75) Inventors: Shin-ichi Kobayashi, Sakai (JP); Katsuo Fukumoto, Nara Prefecture (JP)

(73) Assignee: Nuclear Fuel Industries, Ltd., Tokyo (JP)

( * ) Notice: Subject to any disclaimer, the term of this patent is extended or adjusted under 35 U.S.C. 154(b) by 100 days.

(21) Appl. No.: 10/219,724

(22) Filed: Aug. 15, 2002

(65) Prior Publication Data

US 2003/0062634 A1 Apr. 3, 2003

(30) Foreign Application Priority Data

Oct. 2, 2001 (JP) ........................................ 2001-305909

(51) Int. Cl.[7] ............................ G21C 21/00; C04B 33/32
(52) U.S. Cl. ........................................ 264/0.5; 264/653
(58) Field of Search ................................. 264/653, 0.5

(56) References Cited

U.S. PATENT DOCUMENTS 4,003,855 A * 1/1977 Wong .................... 252/519.13
4,247,500 A * 1/1981 Dixon et al. ................. 264/612
4,348,339 A * 9/1982 Assmann et al.
5,422,920 A * 6/1995 Fujiwara et al. ............ 376/245

FOREIGN PATENT DOCUMENTS

JP            2-259596         10/1990
JP            4-166800         6/1992

* cited by examiner

*Primary Examiner*—Christopher A. Fiorilla
(74) *Attorney, Agent, or Firm*—Flynn, Thiel, Boutell & Tanis, P.C.

(57) ABSTRACT

To furnish stably a sintered nuclear fuel compact of uranium dioxide with a large grain diameter, a fabrication method therefor requires sintering a starting material at two stages in an oxidizing atmosphere and in a reducing atmosphere at relatively low temperatures. The starting material is either a powder mixture of uranium dioxide fresh material powder and triuranium octaoxide in a weight ratio of 75/25 ~ 55/45 or pulverulent mixed uranium oxides yielding a final O/U ratio equal to that of the powder mixture. The sintering process in the oxidizing atmosphere involves at least one time period of a temperature rise to a higher temperature of 1200 to 1100° C. and at least one time period of a temperature drop to a lower temperature of up to 1080° C. A temperature difference between the higher and lower temperatures is preferred to be 50° C. or more.

6 Claims, 4 Drawing Sheets

METHOD OF FABRICATING SINTERED NUCLEAR FUEL COMPACT

BACKGROUND OF THE INVENTION

1. Field of the Invention

This invention relates to a low-temperature method of fabricating a sintered nuclear fuel compact of uranium dioxide with a large grain diameter and more particularly, to an improved method of fabricating a sintered nuclear fuel compact which comprises preparing large grain size pellets stably by two-stage sintering in an oxidizing atmosphere at relatively different low temperatures and in a reducing atmosphere.

2. Description of the Related Art

A low-temperature sintering method for such nuclear fuel pellets is known, which can be carried out at a relatively low temperature on the order of 1100 to 1300° C., in contrast to a conventional sintering method of a nuclear fuel material which was conducted at around 1700° C. In general, low-temperature methods having recourse to a two-stage sintering, which includes sintering in an oxidizing atmosphere and subsequent reduction heating, have been widely known.

For example, JP Patent Publication 4(1992)-166800 A proposed by the same assignee of the present inventors discloses such a low-temperature fabrication method of a sintered nuclear fuel compact which comprises, preparatory to the aforesaid sintering in the oxidizing atmosphere, conducting a pre-heating in a main atmospheric gas of $N_2$/air at a temperature in the vicinity of 150° C. or less to remove an excessive oxygen entrained upon discharging thereby dispersing appropriately the oxygen concentration in a compacted body, and subsequently conducting the sintering in an oxidizing atmosphere, namely in a main atmospheric gas composed of $N_2$ of industrial purity and air, in which is added an oxygen concentration of 400 ppm or less for adjustment of the oxygen concentration, at a temperature of 1100 to 1300° C., followed by reduction heating at 1100 to 1300° C. in a main atmospheric gas composed of $H_2$ or $H_2/N_2$ and 0.01 or upward of $H_2O$ in terms of volume ratio.

Here, the sintered nuclear fuel compact of uranium dioxide series thus obtained has generally an average crystal grain diameter of the order of 5 to 10 $\mu$m. Any sintered nuclear fuel compact of such a small diameter grain crystal is deemed to release a large amount of fission product gas (FR gas). In order to suppress the fission product gas, it is desired that a sintered nuclear fuel compact be a large grain size one having an average crystal grain diameter of ca. 20 to 60 $\mu$m.

On the other hand,, to fabricate a sintered uranium dioxide nuclear fuel compact having a large grain diameter as stated above, the sintering treatment is conducted by the use of a mire containing triuranium octaoxide ($U_3O_8$) obtained by sintering uranium dioxide scrap and uranium dioxide ($UO_2$) fresh material powder. More specifically, for example, a method of fabricating a sintered nuclear fuel compact, whose O/U (oxygen/uranium) ratio is adjusted to 1.98 to 2.02, was also proposed by the same assignee and disclosed in JP Patent Publication 2(1990)-259496 A [JP Patent 7(1995)-31266 B], which comprises sintering a compact, obtained by compaction forming from mixed powers of 75 to 55% by weight of the uranium dioxide starting powder and 25 to 45% by weight of the triuranium octaoxide, in an oxidizing atmosphere at a temperature of 1100 to 1400° C. and subsequently heating it in a reducing atmosphere at a temperature of 1100 to 1400° C. In this method, the sintered nuclear fuel compact having a large grain size is produced by controlling the production condition of a raw material ($UO_2$scrap) for triuranium octaoxide and the amount of the triuranium octaoxide to be mixed together thereby to regulate the density of the resulting sintered compact and the compaction degree upon sintering and by setting specific conditions such as a sintering temperature, etc. thereby to regulate the crystal grain diameter.

According to the foregoing method for fabricating a large grain size sintered compact, it is possible to obtain a sintered nuclear fuel compact having a grain diameter ranging from 20 to 60 $\mu$m and an average crystal density ranging from 93 to 98% TD (total density). In order to render the grain diameter as large as the above, however, many parameters are thus necessitated to be adjusted and a strict temperature regulation is required the control of which is too difficult to yield reliably and stably a sintered nuclear fuel compact of a large grain diameter.

SUMMARY OF THE INVENTION

In view of the actual state of the art stated above, the present invention has been made by finding out the advantages of making temperature changes during the sintering process and altering the sintering temperature ranges twice or more, and accordingly, it is an object of this invention to secure a steady supply of a sintered nuclear fuel compact which can be used suitably for a nuclear fuel material of a light water reactor by preparing uranium dioxide pellets of a large grain diameter stably.

The present invention for attaining the foregoing object resides in a method of fabricating a sintered nuclear fuel compact comprising subjecting a starting material to a two-stage sintering process in an oxidizing atmosphere and in a reducing atmosphere at relatively low temperatures thereby preparing large grain size pellets, which method is characterized in that the starting material is either a powder mixture composed of 75 to 55% by weight of uranium dioxide fresh material powder and 25 to 45% by weight of triuranium octaoxide or pulverulent mixed uranium oxides yielding a final O/U ratio substantially equal to that of the aforesaid powder mixture; and the sintering process in the oxidizing atmosphere is conducted by setting the relatively low temperatures at a higher temperature of 1200 to 1100° C. and a lower temperature of 1080° C. or lower so that the starting material may undergo at least one time of temperature rise to the higher temperature and at least one time of temperature drop to the lower temperature.

In the aforesaid method it is preferred and effective that a temperature difference between the higher temperature and the lower temperature during the sintering process in the oxidizing atmosphere be at least 50° C.

Subsequently of the sintering process in the oxidizing atmosphere, the reduction heating is conducted similarly at a relatively low temperature, say 1050 to 1170° C., but preferably in the vicinity of 1100° C.

The invention will be hereinafter described in more detail with regard to preferred embodiments.

The invention is thus concerned with a two-stage low temperature sintering method, as described above, which comprises conducting sintering of the stating material powder for a nuclear fuel in the oxidizing atmosphere at low temperatures and a reduction heating similarly at a low temperature, wherein during the sintering process in the oxidizing atmosphere, a higher temperature of 1200 to 1100° C. and a lower temperature of 1080° C. or lower are set as the relatively low temperatures and the starting material powder undergoes one time or more of a temperature rise and one time or more of a temperature fall between the higher temperature and the lower temperature, the temperature difference between the higher temperature upon the temperature rise and the lower temperature upon the temperature drop being 50° C. or more.

The staring material powder used for the foregoing method is either a powder mixture of uranium dioxide ($UO_2$) powder and triuranium octaoxide ($U_3O_8$) or pulverulent mixed uranium oxides whose final stoichiometric O/U ratio becomes equal to that of the aforesaid powder mixture.

As the uranium dioxide powder, uranium dioxide ($UO_2$) powder obtained by roasting and reduction of ammonium diuranate (ADU) or ammonium uranyl carbonate (AUC) or any other uranium dioxide powder can be employed.

As the triuranium octaoxide ($U_3O_8$) to be mixed with the uranium dioxide powder, there may be mentioned such triuranium octaoxide that is obtained by roasting a scrap of uranium dioxide sintered nuclear fuel compact ($UO_2$ scrap), e.g., a grinding scrap, rejected pellets, etc. produced in a production step of a sintered nuclear fuel compact of uranium dioxide ($UO_2$ pellets), or un-heated $UO_2$ such as a compacted body.

For instance, when the $UO_2$ scrap is heated gradually from a room temperature, it is convened through $U_4O_9$ via $U_3O_7$ ultimately to $U_3O_8$, which may be in tun converted to $UO_3$ when further heated at a temperature of 500° C. or less in oxygen. As a consequence, in the present invention it is possible to use alternatively a mixture of pulverulent mixed uranium oxides, namely a mixture of uranium dioxide powder and mixed another uranium oxides powder that may contain, for example, triuranium octaoxide ($U_3O_8$), tedium nonaoxide ($U_4O_9$), triuranium hexaoxide ($U_3O_7$), uranium trioxide ($UO_3$), etc. in a powder form.

Further, in cases where the starting material powder contains another metal oxide powder, for example where the aforesaid uranium dioxide fresh material powder is (U, Pu)$O_2$ powder, (U, Pu)$_3O_8$ powder can also be used as the aforementioned triuranium octaoxide powder.

The staring material is first blended evenly. In blending the uranium dioxide starting material powder and the triuranium octaoxide, it is preferred that the amount of the triuranium octaoxide in the resulting mixture be 25 to 45% by weight, more preferably 30 to 40% by weight. By mixing in that condition, it is possible to regulate the crystal grain size and the crystal density of the resulting sintered nuclear fuel compact.

If the mixing amount of the triuranium octaoxide in the mixture is larger than 45% by weight, pores of a large diameter will be formed in the sintered nuclear fuel compact whereas if it is smaller than 25% by weight, the particle size distribution will tend to be extremely non-homogeneous.

For the blending treatment, a known mixer such as a V type blender or a mixing pulverizer such as a ball mill, a mixer, etc. can be used.

The mixture powder thus obtained by the blending treatment is then formed by customary compaction forming under a forming pressure of 5 t/cm$^2$ or downward, preferably, 1.4 to 2.8 t/cm$^2$ into compact pellets, which are subjected to sintering treatment The sintering treatment involves sintering in an oxidizing atmosphere, in particular, a slight oxidizing atmosphere and subsequent heating in a reducing atmosphere. At that time, sintering is conducted in both atmospheres at relatively low temperatures, as described below.

The oxidizing atmosphere exists, for example in the form of carbon dioxide gas, a mixed gas of nitrogen and oxygen, a mixed gas of carbon dioxide and carbon monoxide, etc., but a particularly preferred one is an atmosphere containing $1 \times 10^{-2}$ to $2 \times 10^{-2}$ volume % of oxygen gas in an inert gas.

In the sintering treatment, assuming that the sintering temperature is set within a range of 1000 to 1200° C. and a sintering time of 2 hours is chosen, when sintering is conducted at a lower temperature, say in a range of 1000 to 1100° C., the grain size distribution of the resulting sintered nuclear fuel compact becomes large whereas when sintering is conducted at a higher temperature, say in a range of 1100 to 1200° C., the grain size distribution becomes small. That is, a regulation in the sintering temperature in the oxidizing atmosphere makes it possible to control the crystal grain diameter of the sintered nuclear fuel compact.

The present invention has taken note of the foregoing finding on temperature changes and contemplates rendering the grain size large by causing temperature changes between a specified higher temperature range and a specified lower temperature range and undergoing one time or more of respective temperature changes to the temperature ranges. That is, the sintering process in an oxidizing atmosphere is conducted by setting a higher temperature of 1200 to 1100° C. and a lower temperature of up to 1080° C., and undergoing one time or more of a temperature rise to the higher temperature and one time or more of a temperature fall to the lower temperature.

At that time, the temperature difference between the higher temperature and the lower temperature is preferred to be 50° C. or more, and the time period during the temperature rise or temperature drop is in the range of about 10 minutes to 1 hour.

After the sintering process in the oxidizing atmosphere, the compact thus sintered is subjected to reduction treatment by heating in a reducing atmosphere. The reducing atmosphere is prepared, for example, in the existence of hydrogen gas, a mixed gas of hydrogen and nitrogen, a mixed gas of hydrogen and argon, or any one of these gases coexisting with water vapor.

The reduction treatment conditions such as the kind of gas, time, etc. do not matter particularly, and yet the reduction treatment is preferably conducted at around 1100° C. for about 2 hours. Thereby the O/U ratio ultimately becomes 1.98 to 2.02 and the density of the resulting sintered product of uranium dioxide nuclear fuel reaches 93 to 98% TD.

If the O/U ratio and the density deviate from the aforesaid ranges, there might occur a reduction in melting point and strength of the sintered uranium dioxide nuclear fuel product so obtained, which may cause a deviation from respective design values and accordingly, may be undesirable from the viewpoint of fuel designing.

In this way, there is obtained a sintered nuclear fuel compact with a large grain diameter, whose average grain diameter is 20 to 60 μm or exceeds it This can be used appropriately as a nuclear fuel material for a light water reactor.

The invention will be hereinafter described in more detail by way of examples with reference to the accompanying drawings:

DESCRIPTION OF THE PREFERRED EMBODIMENTS

FIG. 1 to FIG. 4 indicate respective sintering conditions at a specified higher temperature and a specified lower temperature with examples relating to this invention.

EXAMPLES

Example 1

Uranium dioxide starting material powder, 70% by weight, and 30% by weight of triuranium octaoxide roasted at 400° C. were mixed together, and the resulting mixture was compacted and subjected to sintering treatment in a batch type furnace in an oxidizing atmosphere of $N_2/O_2$ gas for 4 hours and subsequently to reduction treatment by heating in a reducing atmosphere of $H_2$ gas for 2 hours. A sintered compact of uranium dioxide series nuclear fuel was thus fabricated.

Figure 1:
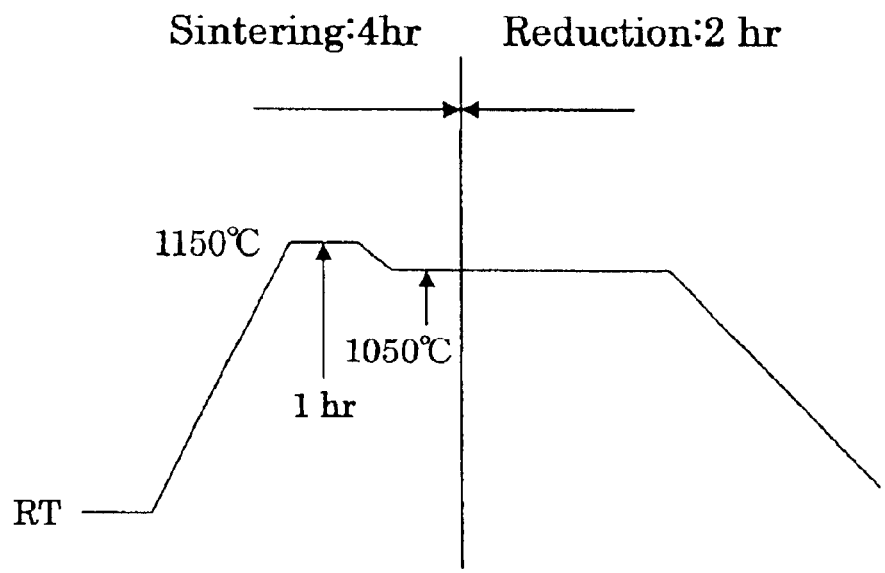
FIG. 1 is a schematic representation indicating a treatment process in the method of Example 1.
Figure 5:
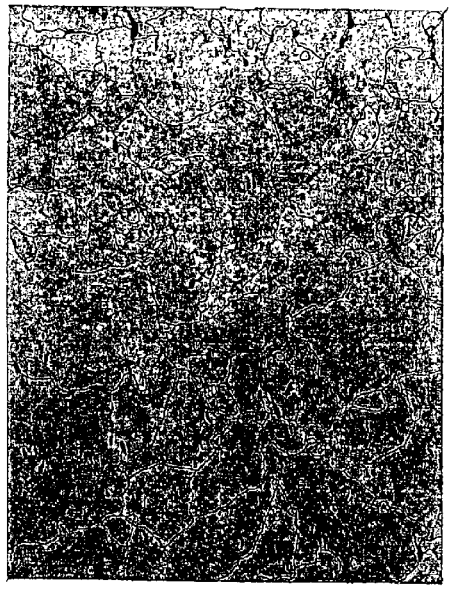
FIG. 5 is a metallographical microscopic observation view of a sintered nuclear fuel compact obtained in Example 1 taken as a photo in a magnification of 100.

At that time, as shown in FIG. 1, during the oxidizing sintering stage, the temperature was raised to 1150° C., maintained at 1150° C. for 1 hour, and then depressed to 1050° C., at which temperature the sintering stage entered into the reduction stage. In this example, one time of temperature rise and one time of temperature drop were thus performed at the beginning of and in the course of the sintering, respectively. The sintered compact thus obtained was, as shown in FIG. 5, of much larger grain diameter pellets (ca. 80 μm), as compared with comparative sintered compacts, which will be described below.

Comparative Example 1

Figure 9:
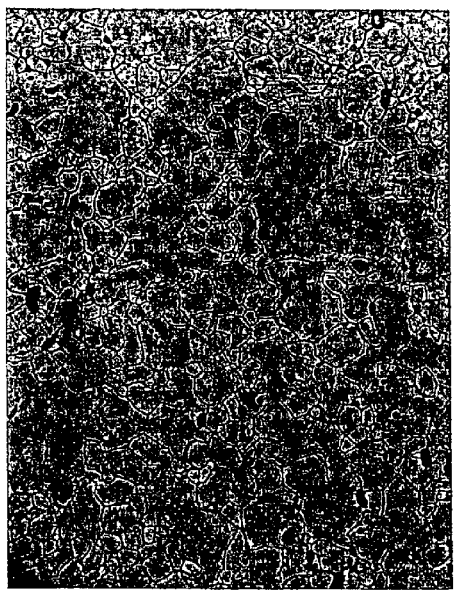
FIG. 9 is a metallographical microscopic observation view of a comparative sintered nuclear fuel compact in Comparative Example 1, wherein in Example 1 the higher temperature was set at 1300° C., taken as a photo in a magnification of 400.

The procedure of Example 1 was repeated except that during sintering in the oxidizing atmosphere, the higher temperature was set at 1300° C., instead of 1150° C. The sintered pellets thus obtained had a small grain diameter (ca. 10 μm) as compared with the counterpart in Example 1, as is clear from FIG. 9.

Comparative Example 2

Figure 10:
FIG. 10 is a metallographical microscopic observation view of another comparative sintered nuclear fuel compact in Comparative Example 2, wherein the lower temperature was set at 1100° C., taken as a photo in a magnification of 400.

The method of Example 1 was also repeated except that during sintering in the oxidizing atmosphere, the lower temperature was set at 1100° C. instead of 1050° C. The sintered pellets thus obtained have likewise a small grain diameter (ca. 10 μm), as is evident from FIG. 10.

Example 2

Figure 2:
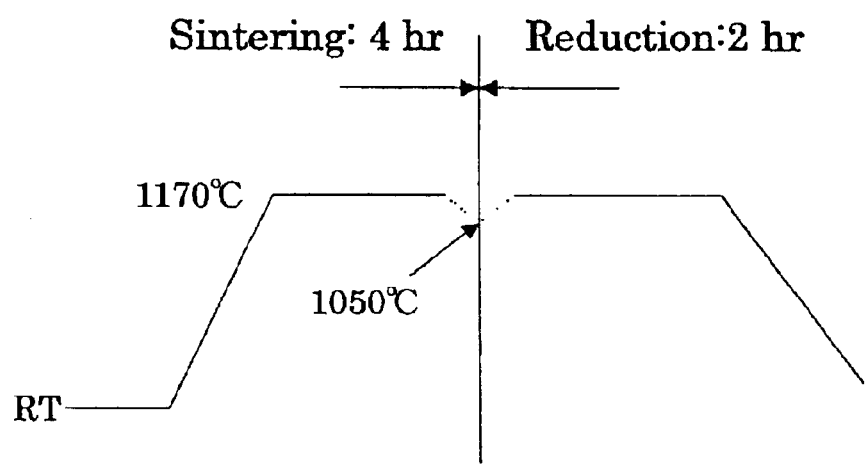
FIG. 2 is a schematic representation indicating a treatment process in the method of Example 2.
Figure 6:
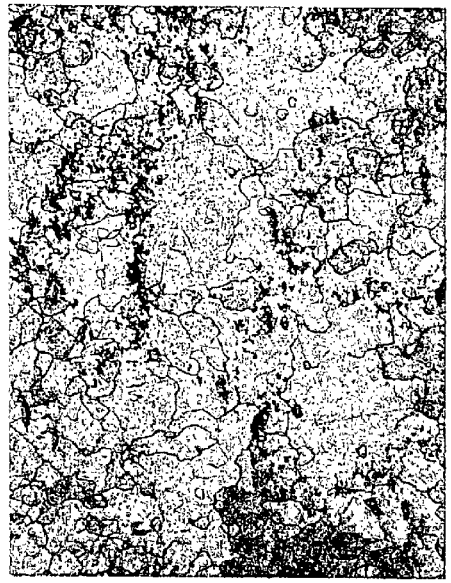
FIG. 6 is a metallographical microscopic observation view of a sintered nuclear fuel compact obtained in Example 2 taken as a photo in a magnification of 100.

A sintered nuclear fuel product was likewise prepared as in Example 1 above except that during the sintering treatment in the oxidizing atmosphere, the temperature was raised to 1170° C. and, at the end of the oxidizing sintering, was depressed from 1170° C. to 1050° C., as shown in FIG. 2, followed by shifting to the reduction process. In this case, one time of temperature rise and one time of temperature drop are undergone at the beginning of and at the end of the sintering in the oxidizing atmosphere. The sintered compact thus obtained had an intended large grain diameter (ca. 60 μm), as is apparent from FIG. 6.

Example 3

Figure 3:
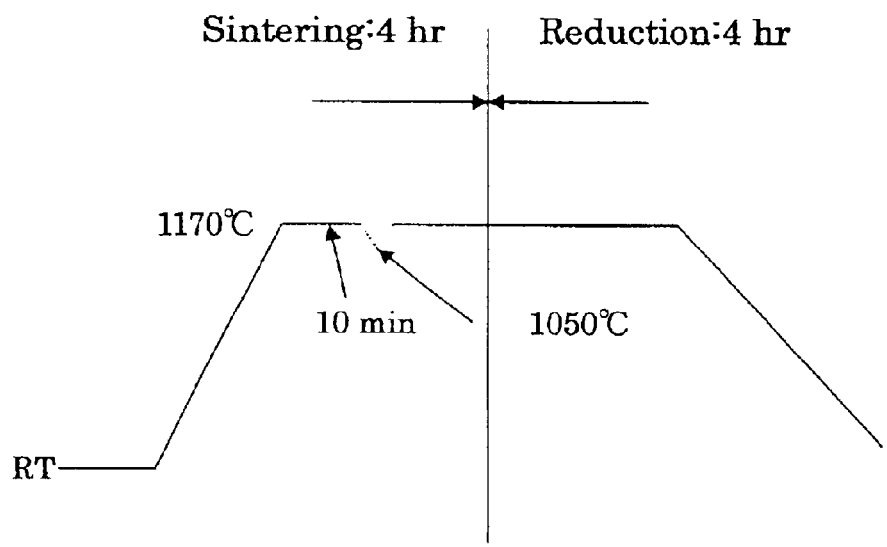
FIG. 3 is a schematic representation indicating a treatment process in the method of Example 3.
Figure 7:
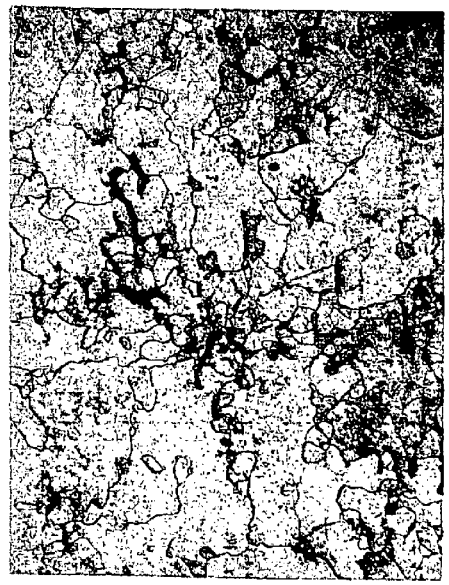
FIG. 7 is a metallographical microscopic observation view of a sintered nuclear fuel compact obtained in Example 3 taken as a photo in a magnification of 100.

A sintered nuclear fuel compact was likewise prepared as in Example 1, except that during the sintering treatment in the oxidizing atmosphere, as shown in FIG. 3, the temperature was raised to 1170° C. and maintained at 1170° C. for 10 minutes, and thereafter, the temperature was once depressed to 1050° C. and again reverted to 1170° C.; and the reduction treatment was performed for 4 hours instead of 2 hours. Here, three times, in total, of temperature changes including one time of temperature rise at the beginning of the treatment, one time of temperature fall in the midst of the treatment and one time of temperature rise at the end were thus undergone. The sintered compact obtained in this way had a large grain diameter (ca. 50 μm) as shown in FIG. 7.

Example 4

Figure 4:
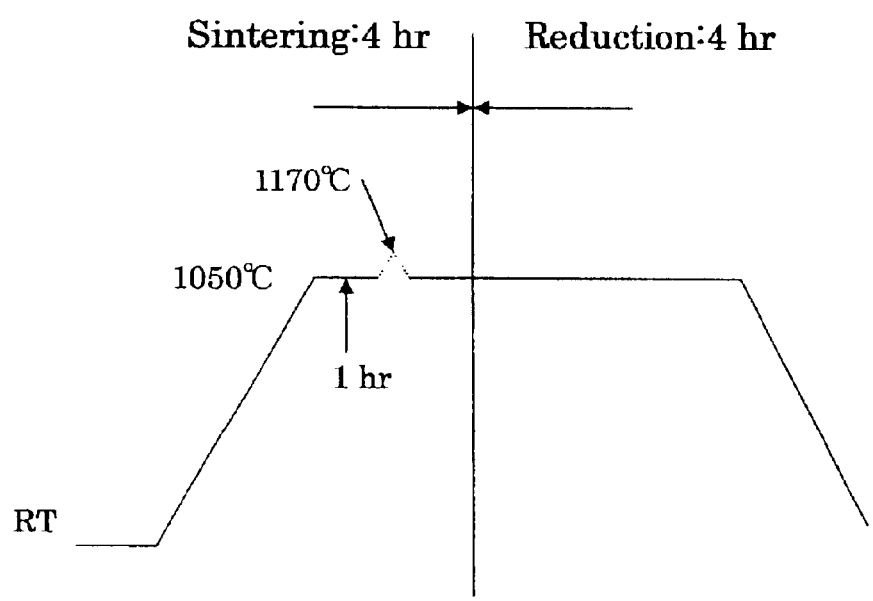
FIG. 4 is a schematic representation indicating a treatment process in the method of Example 4.
Figure 8:
FIG. 8 is a metallographical microscopic observation view of a sintered nuclear fuel compact relating to his invention obtained in Example 4 taken as a photo in a magnification of 100.

The procedure of Example 1 above was repeated except that the sintering treatment in the oxidizing atmosphere was changed, as shown in FIG. 4, to such that a temperature rise to 1050° C. and maintaining at 1050° C. for 1 hour, further temperature rise to 1170° C. and subsequent temperature drop to 1050° C. were conducted; and the reduction treatment was conducted for 4 hours instead of 2 hours. Here, three times of temperature changes in total including two times of temperature rise and one time of temperature drop were undergone. The sintered compact thus obtained had a large grain diameter (ca. 80 μm) as shown in FIG. 8.

In all Examples and Comparative Examples above, the sintering was performed in a batch type sintering furnace, but a continuous type of one may also be used if only the oxidizing atmosphere range is divided into two temperature ranges and it is possible to achieve a similar temperature hysteresis to the case with the batch type furnace.

As described above, the invention is concerned with the fabrication of a sintered nuclear fuel compact comprising a two-stage sintering treatment in an oxidizing atmosphere at relatively low temperatures and a reducing atmosphere at a low temperature, and characterized in that the sintering temperatures in the oxidizing atmosphere were chosen in a specified range within which one time or more of a temperature rise and one time or more of a temperature drop, namely more than two times in total of temperature changes are undergone. According to this invention, no strict temperature adjustment is required to make the grain size large, in contradistinction to conventional method wherein the sintering temperature in an oxidizing atmosphere is adjusted and controlled strictly thereby to alter the crystal grain diameter. As a consequence, a sintered compact with a large grain size is obtainable with ease and stably. Further, it is more efficient to set the temperature difference between the higher temperature and the lower temperature to be 50° C. or greater.

What is claimed is:

1. A method of fabricating a sintered nuclear fuel compact of uranium dioxide comprising the steps of:

providing a starting material that yields a sintered product having an O/U ratio of 1.98 to 2.02 and comprises either:

(a) a powder mixture of 75 to 55% by weight of uranium dioxide fresh material powder and 25 to 45% by weight of triuranium octaoxide; or (b) pulverant mixed uranium oxides which may comprise at least one of triuranium octaoxide, tetrauranium nonaoxide, triuranium hexaoxide and uranium trioxide and yield a final stoichiometric O/U ratio substantially equal to that of the powder mixture;

two-stage sintering the starting material in an oxidizing atmosphere at a high temperature of from 1200 to 1100° C. in the first stage and a low temperature of no more than 1080° C. in the second stage such that there is at least one temperature rise to the high temperature and at least one temperature drop to the low temperature; and heating the sintered starting material in a reducing atmosphere to produce the sintered product.

2. The method of claim 1, wherein a temperature difference between the high temperature and the low temperature is 50° C. or greater.

3. The method of claim 1, wherein the sintered starting material is heated in the reducing atmosphere at temperature of from 1050 to 1170° C.

4. The method of claim 3, wherein the sintered starting material is heated in the reducing atmosphere at a temperature of about 1100° C.

5. The method of claim 1, wherein the sintered nuclear fuel compact has a mean grain diameter of from 20 to 60 $\mu$m.

6. The method of Claim 1, wherein the sintered nuclear fuel compact has a mean grain diameter exceeding 60 $\mu$m.

* * * * *